Sept. 29, 1964 H. A. NEUMANN 3,150,540
HYDRAULIC PUMPS

Filed Sept. 16, 1960 2 Sheets-Sheet 1

United States Patent Office  3,150,540
Patented Sept. 29, 1964

3,150,540
HYDRAULIC PUMPS
Heinz Alfons Neumann, Enfield, South Australia,
Australia (Flat 7, 6 Swinton Ave., Kew, Victoria,
Australia)
Filed Sept. 16, 1960, Ser. No. 56,500
Claims priority, application Australia Sept. 21, 1959
6 Claims. (Cl. 74—571)

This invention relates to certain improvements in piston type hydraulic machines of the type which are normally used as pumps, but, as is common with such hydraulic machines, may also be used as hydraulic motors.

For non-rotary radial pumps, drive shafts employing eccentric controls have already been developed and have been used both for high and low pressure applications. The usual existing type of control employs a hollow drive shaft with a cross slot or a fork. In the slot or fork are members which carry anti-friction bearings, and the control previously used moves a push rod so that members in the slot or fork will force the anti-friction bearing out of centre and thereby vary the degree of eccentricity, that is the amount of throw of the crank.

It has been proposed to operate the push rod by stroke or pressure compensated controls, and when pressure compensated controls are used they are usually employed in conjunction with coil springs.

The controls are normally located outside the pump body, and are somewhat bulky when compared to the pump size. The weight and dimension of this type of pump limit the use, so that such controls are unsuitable for any but very small machines when employed in aircraft or automotive applications.

The main object of this invention is to provide a means whereby effective control may be achieved in a smaller space than hitherto.

This invention is characterised by a crankshaft which is eccentrically disposed in a crank mounting shaft and joined thereto by a torsion bar threaded at one end and splined at the other.

By using a crankshaft which is eccentrically mounted in a crank mounting shaft, effective control of the amount of throw can be achieved by simply varying the relative radial position of the crankshaft and the crank mounting shaft, and this can be achieved by axial movement of the threaded and splined torsion bar.

The invention is described hereunder in further detail with reference to embodiments, these being illustrated in the accompanying drawings in which:—

Figure 4:
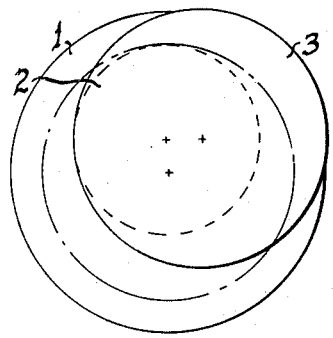
Figure 5:
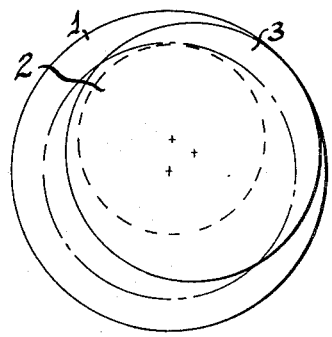
Figure 1:
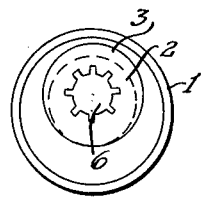
Figure 2:
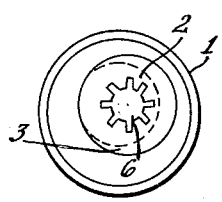
Figure 3:
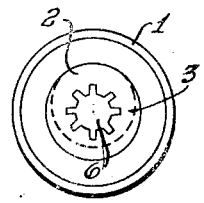
Figure 7:
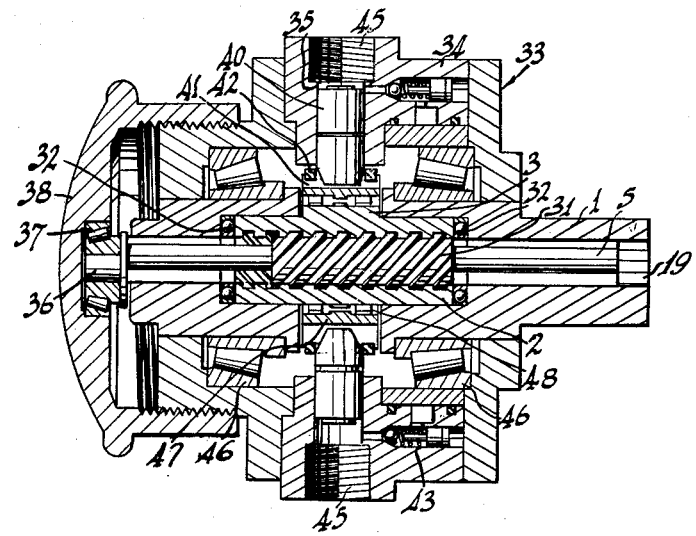
Figure 6:
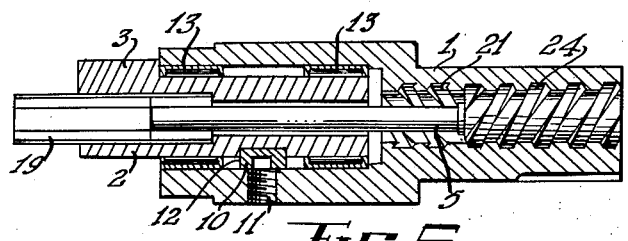

FIG. 1 is an end view of a crankshaft within a crank mounting shaft, illustrating a point of maximum throw, FIG. 2 shows the arrangement of FIG. 1 with the crankshaft rotated 90 degrees within the crank mounting shaft, with a consequent reduction of throw, FIG. 3 shows the crankshaft rotated 180 degrees from the position shown in FIG. 1, illustrating a point of minimum throw, in this case being zero, FIG. 4 is an end view of a crankshaft and crank mounting shaft assembly showing the preferred maximum throw within a range of control, FIG. 5 is a view similar to FIG. 4 but showing the crankshaft radially displaced by 30 degrees from the position shown in FIG. 4 to illustrate the preferred minimum throw of the range of controls, FIG. 6 is a section through a crankshaft and crank mounting shaft assembly according to a first embodiment, and FIG. 7 is a section through a crankshaft and crank mounting shaft assembly according to a second embodiment.

Referring first to FIGS. 1, 2, 3, 4 and 5 a crank mounting shaft 1 carries rotatably within it a crankshaft 2 (shown dotted) the free end of the crankshaft 2 consisting of the crank 3. The crankshaft 2 is displaced from the axis of the crank mounting shaft 1 but is parallel thereto, and the degree of displacement is equal to the throw of the crank 3 in relation to the crankshaft 2. The crankshaft 2 and crank mounting shaft 1 are joined by a torsion bar 5 co-axial with the crankshaft 2 (see FIG. 6).

FIG. 1 illustrates a position of maximum throw when the torsion bar 5 is not deflected radially, FIG. 2 shows a position where the torsion bar 5 is deflected through an angle 90 degrees, and FIG. 3 shows a position where the torsion bar is deflected through an angle of 180 degrees, whereupon there is no throw of the crank, the crank in this position being co-axial with the crank mounting shaft.

FIGS. 1, 2 and 3 are intended to be illustrative of the principle of the invention and not necessarily of an embodiment, since it would only be in extreme cases that the torsion bar 5 would be required to be twisted through 180 degrees to vary the crank from a full throw to no throw at all.

Referring now to FIG. 6 in more detail, the crankshaft 2 is retained axially to the crank mounting shaft 1 by means of the bearing member 10 which is fixed by the screw 11 to the crank mounting shaft 1, and which is accommodated in a circumferential slot 12 in the crankshaft 2, the length of the slot 12 determining the maximum and minimum deflection of the torsion bar 5, and thus determining the maximum and minimum throw.

A consideration of the above description will indicate that the throw of the crank becomes a trigonometrical function of the torque on the crankshaft 2 which is transmitted from the crank mounting shaft 1 by means of the torsion bar 5.

The needle roller bearings 13, being of low friction, ensure an accurate relationship between the torque and the throw.

The crank mounting shaft 1 rotationally supports the crankshaft 2 through the needle roller bearings 13, the splined bar 19 engaging the crankshaft 2 and being axially slidable therein, and being connected to a threaded portion 24 engaging the thread 21 in the crank mounting shaft 1, the interconnection between the splined bar 19 and the threaded portion 24 being by the torsion bar 5.

By axially positioning the splined bar 19 in relation to the crankshaft 2, the throw of the crank 3 for no deflection of the torsion bar 5 is fixed, and the range of useful operation of the torsion bar 5 is thereby readily adjusted.

FIGS. 4 and 5 illustrate an ideal range for average purposes, wherein the angular displacement of the crankshaft within the crank mounting shaft ranges over 30 degrees, the centre positions of FIG. 4 subtending a right angle and of FIG. 5 subtending an angle of 60 degrees. This range is fixed in the above embodiment by the length of the slot 12 in the crankshaft 2 and the positioning of the torsion bar 5, or the torsion spring 15. Over a short radial range between the displacements illustrated, the torque becomes approximately proportional to the variation in throw of the crank.

FIG. 7 illustrates how the invention is utilised in a pump. A pump 33 comprises a body 34 with a plurality of cylinders 35 disposed radially about it. The crank mounting shaft 1 comprises two portions, one on each side of the crank 3, and the crankshaft 2 is threaded to receive the threaded portion 31 of the splined bar 19. The cranked end 36 of the torsion bar 5 is journalled in a bearing 37 in a screw-threaded adjustment cap 38, the adjustment cap being screwed to the body 34 of the pump 33. By simply screwing the adjustment cap 38 inwardly, the torsion bar 5 is urged inwardly in relation to the crank mounting shaft 1 and thereby rotates the crankshaft 2 relative to the crank mounting shaft 1 to vary the throw of the crank 3. The thrust is resisted by the balls 32. Pistons 40 are disposed one in each of the cylinders and have enlarged base portions 41 which are retained to the crank 3 by means of the rings 42. An exhaust valve 43 is positioned at the top of each cylinder, but the inlet and outlet valves are disposed in members (not shown) which are fitted to the screw-threaded openings 45.

The crank mounting shaft 1 is journalled to the body 34 by means of the tapered roller bearings 46. A journalled sleeve 47 is disposed around the crank needle rollers 48 on the crank 3.

A consideration of the above embodiment will show that the invention makes possible a very simple control whereby the pump may be used for high volume low presure or low volume high pressure, a standard size drive shaft may be used, and yet the pump or hydraulic motor is essentially very simple and small in size for a given capacity.

What I claim is:

1. A throw control for a hydraulic pump comprising a crank mounting shaft adapted for rotation in a pump body, said shaft having a given axis, a crankshaft rotatably supported in said crank mounting shaft, said crankshaft having an axis in parallel displaced relation from the axis of said crank mounting shaft, a torsion bar co-axially supported with respect to said crankshaft, said torsion bar including a threaded portion threadably engaging said crankshaft, said torsion bar including a splined portion engaging complementary splines in the crank mounting shaft, said torsion bar being resiliently yieldable between said threaded portion and said splined portion in accordance with predetermined rotational resistance of said torsion bar to permit yielding of said torsion bar under load for thereby varying the relative displacement of said axes to automatically control the throw of said crankshaft.

2. A control as claimed in claim 1 wherein said torsion bar has an end at which is located the splined portion.

3. A control as claimed in claim 1 wherein said portions are spaced from one another on the torsion rod.

4. A throw control for a hydraulic pump comprising a crank mounting shaft adapted for rotation in a pump body, said shaft having a given axis, a crank shaft rotatable in said crank mounting shaft, said crankshaft having an axis in parallel displaced relation from the axis of said crank mounting shaft, said crankshaft having an outer surface provided with a circumferential slot extending part-way therearound, a bearing member on and extending inwardly from said crank mounting shaft, said bearing member being slidably engaged in said circumferential slot and limiting thereby relative rotational movement of said crankshaft within said crank mounting shaft, a torsion bar co-axially supported with respect to said crankshaft, said torsion bar including a splined portion slidably engaging complementary splines in said crankshaft, said torsion bar including a threaded portion threadably engaged in said crank mounting shaft, said torsion bar being resiliently yieldable between said threaded portion and said splined portion in accordance with predetermined rotational resistance of said torsion bar to permit yielding of said torsion bar under load for thereby varying the relative displacement of said axes to automatically control the throw of said crankshaft.

5. A control as claimed in claim 4 wherein said torsion bar has opposite ends, and said splined portion and threaded portion are located at respective opposite ends of the torsion bar.

6. A throw control for a hydraulic pump comprising a crank mounting shaft having opposite ends and adapted for rotation in a pump body, said shaft having a given axis, a crankshaft rotatably supported in said crank mounting shaft, said crankshaft having an axis in parallel displaced relation from the axis of said crank mounting shaft, a torsion bar co-axially supported with respect to said crankshaft, said torsion bar including a threaded portion threadably engaging said crankshaft, said torsion bar including a splined end engaging complementary splines in one end of said crank mounting shaft, said torsion bar including a cranked end remote from said splined end and extending beyond the other of the ends of said crank mounting shaft, the cranked end of said torsion bar being co-axial with said crank mounting shaft, a bearing on said cranked end of said torsion bar adapted for being housed in a screw-threaded adjustment cap, which is threadably engaged in the pump body, said torsion bar being resiliently yieldable between said threaded portion and said splined end in accordance with predetermined rotational resistance of said torsional bar to permit yielding of the torsion bar under load for thereby varying the relative displacement of said axes to automatically control the throw of said crankshaft within a range determined by the positioning of said adjustment cap relative to said pump body.

References Cited in the file of this patent

UNITED STATES PATENTS

| | | |
|---|---|---|
| 1,630,168 | Caut | May 24, 1927 |
| 1,660,183 | Weeden | Feb. 21, 1928 |
| 1,982,958 | Kraus | Dec. 4, 1934 |
| 2,266,003 | Clark | Dec. 16, 1941 |
| 2,309,551 | Trapp et al. | Jan. 26, 1943 |
| 2,336,996 | McDonough | Dec. 14, 1943 |
| 2,426,100 | Holden et al. | Aug. 19, 1947 |
| 2,621,607 | Trapp | Dec. 16, 1952 |
| 2,818,816 | Christenson | Jan. 7, 1958 |
| 2,842,982 | Holdener | July 15, 1958 |

FOREIGN PATENTS

| | | |
|---|---|---|
| 204,332 | Switzerland | Oct. 2, 1939 |
| 539,399 | Great Britain | Sept. 9, 1941 |
| 770,053 | Great Britain | Mar. 13, 1957 |